United States Patent Office 3,097,485
Patented July 16, 1963

3,097,485
GAS TURBINE ACCELERATOR
Joseph B. Bidwell, Birmingham, Mich., assignor to General Motors Corporation, Detroit, Mich., a corporation of Delaware
Filed July 2, 1959, Ser. No. 824,523
10 Claims. (Cl. 60—39.14)

My invention relates to gas turbine power plants, and particularly to means for improving the acceleration of such power plants. The improvement is best adapted to, but is not restricted to, gas turbine engines of the free power turbine type. Such engines include a gas generator, usually comprising a compressor, combustion apparatus, and a turbine driving the compressor, and a power turbine rotatably independent of the gas generator which drives the power output shaft of the engine. Such engines have been used for propelling vehicles.

An important defect of such engines for propulsion of automobiles and the like, as compared to the usual gasoline reciprocating engine, lies in the relatively long period of time required for the engine to develop full power after it has been run at an idling or low throttle condition. Such acceleration involves an increase in fuel supply to the engine, acceleration of the gas generator turbine from a relatively low speed to its normal full power operating speed, and acceleration of the power turbine from a standstill. Due to the inherent characteristics of gas generators, they require considerable time to accelerate from idle to full speed; and the power available from the power turbine is relatively low until the gas generator is nearly at full speed.

In a particular example of a small free turbine type of engine of about 200 horsepower which has been employed for automotive propulsion, the idle speed of the gas generator is about 40% of its full speed. Assuming the engine is operating at idle, it is accelerated by increasing the fuel supply, but, because of limitations imposed by maximum allowable turbine temperature and problems of compressor surge, the fuel may be increased only gradually. In this particular case, the gas generator reaches approximately 65% full speed in three seconds; 75% in four and one-half seconds; and full speed in about six seconds. The stall torque of the power turbine corresponding to these gas generator speeds is approximately 16%, 36% and 100%, respectively, of the rated power turbine stall torque. The maximum power output of the power turbine at the same points is about 7%, 22% and 100%, respectively, of the full rated output.

It will be apparent from the foregoing that, even after five seconds of acceleration of the gas generator, the torque and available power output of the power turbine are still quite low; and full acceleration of the vehicle is not attained until some six seconds after the operator actuates his power control to call for acceleration from a standstill or, in general, from an idling mode of operation of the engine. This is poor performance compared to the almost instantaneous throttle response and rapid acceleration of a modern reciprocating engine. It would, of course, be possible to run the gas generator at full speed at all times and brake or declutch the power turbine; but this would waste fuel.

This acceleration problem has been recognized, and it has been proposed (see British Patent 723,266) to employ an electric motor coupled to the gas generator through an overrunning clutch to assist the acceleration of the turbine. This proposal is unrealistic in view of the high horsepower required to accelerate even a small turbine in a short time, as will be seen.

My invention may be summarized by stating that it involves providing an energy storage device such as a flywheel from which power is very quickly delivered to the gas generator compressor and turbine to accelerate them from idle speed operation to full speed operation in a very short time, such as 1/10 to 1/2 second. As a result, the gas generator can put out full volume of motive fluid at motive temperature to the power turbine in something like 1/10 to 1/2 second rather than six seconds. The ultimate result is a radical improvement in the throttle response and acceleration characteristics of the vehicle.

To accomplish this rapid acceleration with an engine of power output sufficient to propel satisfactorily a full-sized automobile, that is, an engine of roughly 200 horsepower, requires a very high rate of supply of energy to the gas generator rotor. The total energy supply to the rotor may be about 60,000 foot-pounds. This is about 240 horsepower if accomplished in 1/2 second, and about 1200 horsepower if only 1/10 second is allowed. Of course, the average rate of addition of energy to the flywheel over a period of time must equal the average rate at which energy is delivered from the flywheel to the engine, plus any losses; but, since the delivery of energy to the engine is intermittent or occasional, the flywheel may be accelerated over a period of time by a motor or other power source having a relatively modest output, somewhere about 2% of the maximum power output of the turbine engine.

The objects of the invention are to improve the performance and particularly the acceleration ability of gas turbine engines, and to provide simple, compact and effective mechanism for this purpose.

The nature of the invention and the advantages thereof will be apparent to those skilled in the art from the accompanying drawings and succeeding detailed description of preferred embodiments of the invention.

Figure 1:
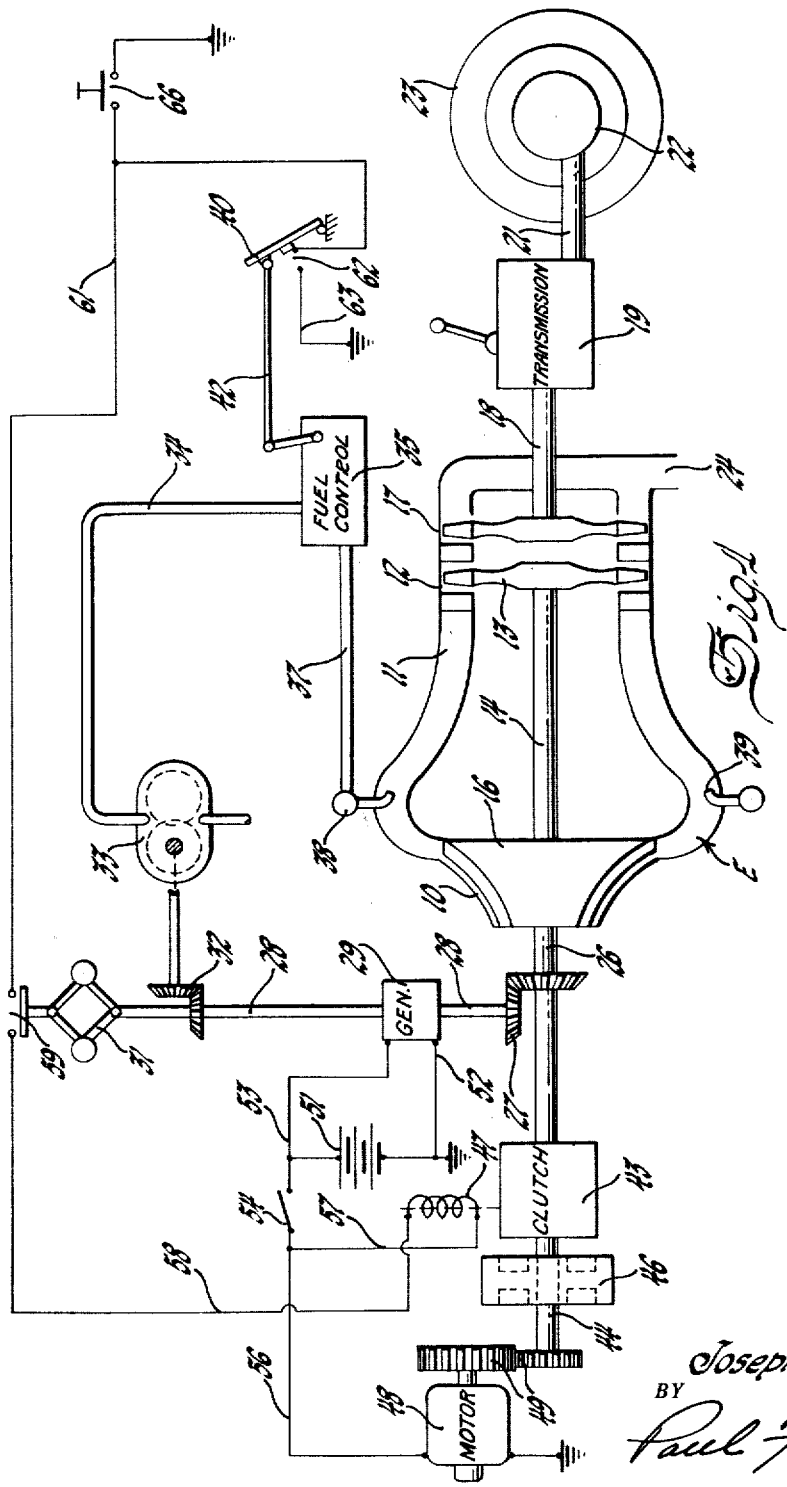
FIGURE 1 is a schematic illustration of an automotive gas turbine installation embodying the invention, in which the flywheel is energized by an electric motor.

Referring first to FIGURE 1, there is shown schematically an automotive installation of a free turbine type gas turbine engine. The engine and the vehicle installation may be of the general nature of those described in some detail in prior patent applications, of common ownership with this application, including Serial No. 403,824, filed January 13, 1954 (Patent No. 2,972,230), and Serial No. 559,475, filed January 16, 1956, now abandoned. The details of the engine, being immaterial to an understanding of the invention, are not shown. The engine E comprises a compressor 10, combustion apparatus 11, and a turbine 12. The turbine includes a rotor 13 which is connected by a shaft 14 to the rotor 16 of the compressor. The compressor, combustion apparatus, and turbine constitute a gas generator. The rotors 13 and 16 and the shaft 14 constitute the gas generator rotor, hereafter referred to as the rotor. The motive fluid discharged from the gas generator flows through a power turbine 17 which drives a power output shaft 18. The power output shaft is coupled by a suitable transmission 19, propeller shaft 21, and differential gear or the like 22 to the propelling wheels 23 of the vehicle, one of which is shown. The gas exhausted from the power turbine is discharged through a duct 24.

The gas generator drives an accessory shaft 26 which drives certain engine accessories and controls. As illustrated, shaft 26 is coupled by bevel gears 27 to a shaft 28 which drives an electric generator 29 and continues to a speed-responsive flyball device 31. Shaft 28 also drives, through bevel gears 32, a fuel pump 33. The pump takes fuel from a source, not illustrated, and delivers it through line 34, a fuel control 35, and line 37 to a manifold 38 which supplies the fuel nozzles 39 of the to a combustion apparatus. The fuel control may be of any suitable type. The details thereof are immaterial to this invention.

A manually operable control such as a foot throttle pedal 40 is connected by linkage 42 to the fuel control to establish the desired power output of the engine and control the speed of the vehicle.

Gas generator shaft 26 is coupled through a suitable clutch 43 to a shaft 44 on which is mounted a flywheel 46. The clutch 43 is of a normally disengaged type which may be caused to engage by an electric current. As illustrated, the clutch includes an engaging solenoid 47 which causes the clutch to engage as long as the solenoid is energized. The details of the clutch are immaterial to the invention. It could be a friction clutch, a fill-and-empty fluid coupling, a magnetic clutch, or any other clutch which may be quickly engaged and released. In normal operation of the engine, clutch 43 is disengaged, and the flywheel 46 is brought up to its normal operating speed and continued in rotation at that speed by an electric motor 48 coupled by gearing 49 to shaft 44. Gearing 49 is preferably a step-up gearing, since it is contemplated that the flywheel 46 turn at a rather high speed, such as 56,000 r.p.m. Motor 48 is preferably of a type having an inherent maximum speed, such as a compound type D.C. motor.

Power is supplied to the motor 48 and the controls for clutch 43 from any suitable source, such as the automobile battery 51 charged through leads 52 and 53 by the generator 29. Current is supplied from the battery through a cutout switch 54 and line 56 to motor 48. The clutch engaging circuit comprises a lead 57 energized through switch 54, coil 47, a lead 58, a speed responsive switch 59, lead 61, switch 62 operated by the foot throttle 40, and a lead 63 to ground.

Cutout switch 54 may be opened to disable the accelerating system, but otherwise is left closed. The speed responsive switch 59 is operated by the speed responsive device 31 coupled to the rotor. It is closed whenever the rotor is below its full rated speed, which may be assumed to be 35,000 r.p.m. by way of example. The manually operated switch 62 is closed when the foot throttle is moved to its maximum power position, calling for full acceleration of the engine. It will be seen, therefore, that coil 47 is energized and thereby clutch 43 is engaged whenever full power is called for by the foot throttle and the gas generator is operating below its full rated speed.

In explaining the operation of the system, we may assume for purposes of illustration that the idling speed of the rotor is 14,000 r.p.m. and its rated speed is 35,000. We may also assume that the normal or full speed of the flywheel 46 is 56,000 r.p.m. and that the coupling device 43 is a simple friction clutch or a device having equivalent characteristics. In this case, when the clutch is engaged, the torque input and output of the clutch are equal. We may also assume that the moment of inertia of the gasifier rotor assembly is 0.011 lb. sec.$^2$ ft. These values are representative of a particular engine. If we assume that the engine is idling at 14,000 r.p.m. and the flywheel is floating at 56,000 r.p.m.; that when the two are clutched together sufficient energy is transferred from the flywheel to the rotor to accelerate it to 35,000 r.p.m.; and that, in so doing, the speed of the flywheel is reduced to 35,000 r.p.m., the required moment of inertia of the flywheel to supply this energy can be computed. In this particular case, because of the speed values selected, the moment of inertia of the flywheel will equal that of the rotor, 0.011 lb. sec.$^2$ ft. From this, it may be computed that a steel flywheel having a diameter of 2.66 inches and an axial length of 2.84 inches with a rim weight of 7.18 pounds can supply the required energy, including that dissipated by friction in the clutch. The energy conversion or clutch efficiency will be .538. It will be seen from the foregoing that the size of flywheel required for a 200 horsepower gas turbine is remarkably small. In fact, the flywheel would undoubtedly be much smaller than the motor. In a detailed calculation of the system, the equivalent moment of inertia of the motor 48 and gears 49 and of the parts of the clutch 43 which rotate with the flywheel would be included as part of the flywheel mass. In other words, the flywheel 46 shown in the drawings may be regarded as symbolical of the total flywheel effect of the rotating parts which normally run free of the gas generator rotor. Also, the parts of clutch 43 which rotate with the rotor will add to the moment of inertia of the rotor.

The increase in kinetic energy supplied to the rotor under the foregoing conditions is approximately 63,000 foot-pounds, and the decrease in kinetic energy of the flywheel is this figure divided by the conversion efficiency, or about 115,000 foot-pounds. Expressed in different units, the energy loss of the flywheel in accelerating the engine is approximately 3½ horsepower minutes. The flywheel may deliver 2000 horsepower for a fraction of a second. However, since such maximum acceleration will be required only at reasonable intervals, the rate of supply of energy to bring the flywheel up to speed between the times at which it is used to accelerate the engine may be relatively modest. For example, a constant supply rate of two horsepower would accelerate the flywheel from 35,000 r.p.m. to 56,000 r.p.m. in a little under two minutes. The foregoing quantitive discussion is believed to be helpful in appreciating the significance and practicality of the invention.

Proceeding to a description of the operation of the system shown in FIGURE 1, we may assume that the engine is idling with the rotor running at 14,000 r.p.m. and that the flywheel has been accelerated to 56,000 r.p.m. Under these conditions, switch 59 will be closed and switch 62 will be open. If the operator of the vehicle moves the foot throttle 40 to the full power position, closing switch 62, solenoid 47 will be energized from the battery through the circuit previously noted and will engage the clutch. The clutch torque will decelerate the flywheel and accelerate the rotor in approximately 1/10 second. With the increase in engine speed and compressor discharge pressure, the fuel control will respond to supply the quantity of fuel adapted to full power operation and the gas generator will almost instantaneously be shifted from idle operation to full power operation, thus providing a maximum supply of hot gas to the power turbine 17 and causing maximum acceleration of the vehicle. As soon as the rotor reaches full operating speed, the speed responsive device 31 opens switch 59, releasing clutch 43. The continuously energized motor 48 then gradually accelerates the flywheel to its normal 56,000 r.p.m. speed.

If the vehicle operator should call for full power when the gas generator is operating at some intermediate power level; say, for example, at 30,000 r.p.m., the flywheel will also be clutched to the gas generator. In this case, the flywheel will have an excess of energy over that required, but as soon as the gas generator has been accelerated to 35,000 r.p.m. switch 59 will open. If only modest acceleration is desired and the foot throttle is not fully moved, the accelerating device of the invention will remain out of operation, since switch 62 will be open. It is, of course, possible to provide additional resistance to the final movement of the foot throttle, as is done in present automobiles where a downshift or supercharger clutch is operated at maximum throttle position, so that the accelerator flywheel is clutched to the rotor only by excess movement against greater throttle pedal resistance.

A manually operable push button switch may be provided between line 61 and ground so that the clutch 43 may be engaged at will so as to permit motor 48 to be used as a starting motor for the engine E. Since a starting motor is required for the gas turbine and it may conveniently be an electric motor, the accelerating system requires very little structure additional to the ordinary installation; merely the flywheel 46, clutch 43 and the clutch controls. In order to start the gas turbine, the motor may be energized by switch 54 and, when the flywheel has reached a sufficient speed, switch 66 may be closed to engage clutch 43.

Figure 2:
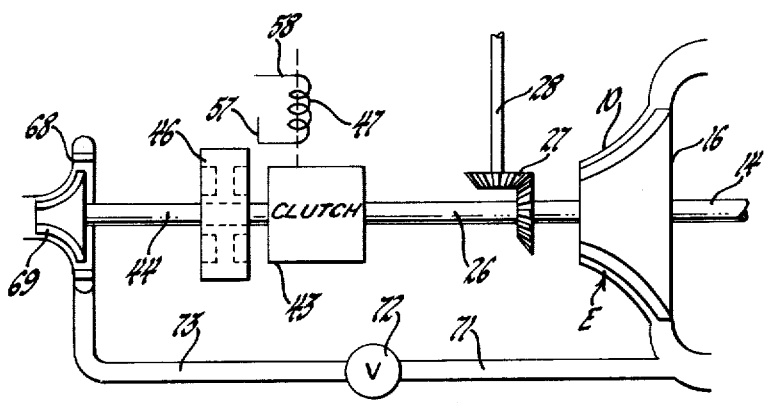
FIGURE 2 is a partial schematic drawing of a modification of the system of FIGURE 1, in which the flywheel is energized by a turbine supplied from the gas generator.

FIGURE 2 illustrates the parts of the system of FIGURE 1 which may be changed to provide for energization of the flywheel by a turbine supplied from the gas turbine engine. Parts which are the same as previously described with relation to FIGURE 1 have the same reference numerals. It will be noted that motor 48 and gears 46 of FIGURE 1 are omitted, and a small radial inflow turbine 68 is provided instead. The rotor 69 of this turbine may be mounted on shaft 44. The turbine may be energized from the gas generator, preferably by compressed air taken from the compressor 10 through a pipe 71, a shutoff valve 72, and a pipe 73. Since small turbines such as 68 are inherently high speed devices, the turbine may be directly connected to the flywheel. While the turbine need not be of the radial inflow type, such a turbine is advantageous both because of its simple structure and because of its characteristics. Because of back pressure effects, such a turbine wastes less motive fluid when it is running idle at high speed, as when the flywheel has been brought up to speed and the turbine merely is maintaining the flywheel speed. Turbines of this or other types may have an inherent speed limiting characteristic so that the turbine will not drive the flywheel overspeed. Valve 72 is provided to cut out the accelerating system, if desired. The clutch 43 may be operated by the circuit previously described in connection with FIGURE 1. A separate starter motor (not shown) may be provided or an external source of compressed air may be used for energizing turbine 69 so that it, with flywheel 46, may act as an inertia starter for the engine.

Figure 3:
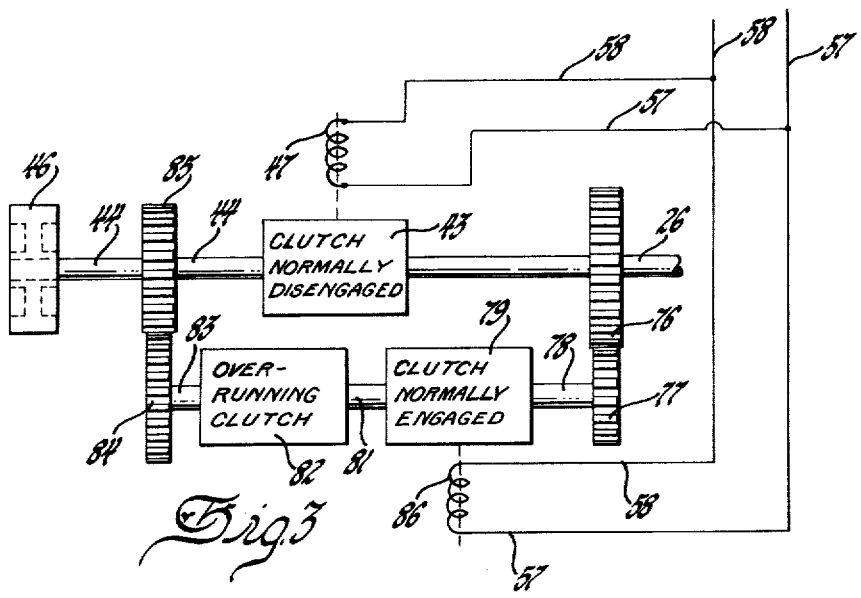
FIGURE 3 is a partial schematic view of a third embodiment of the invention, in which the flywheel is energized by a mechanical transmission from the gas generator rotor.

FIGURE 3 illustrates changes in the system of FIGURE 1 to provide a system in which the flywheel 46 is energized by power taken from the accessory drive shaft 26 of the gas generator.

Shaft 26 is coupled through clutch 43 and shaft 44 to the flywheel as previously described so that the flywheel may accelerate the engine. To supply energy to the flywheel, there are mechanical means for power transmission from shaft 26 to shaft 44 comprising a gear 76 on shaft 26, a gear 77 driven by gear 76, a shaft 78, a normally engaged clutch 79, a shaft 81, an overrunning clutch 82, a shaft 83, a gear 84 on the shaft, and a gear 85 on shaft 44 driven by gear 84. The normally engaged clutch may be of a type which is disengaged by supplying electrical energy to a coil 86 connected to lines 57 and 58 in parallel with coil 47. When the circuit through leads 57 and 58 is open, clutch 43 is disengaged and clutch 79 is engaged. The rotor then drives through shaft 26, gears 76, 77, clutch 79, overrunning clutch 82, and gears 84, 85 to speed up the flywheel. Assuming the previously used values for rotor idle and rated speeds and flywheel maximum speed, the overall ratio of the two sets of gears 76, 77 and 84, 85 should be a 1.6 to 1 step-up ratio. Thus the flywheel will reach its normal speed when the rotor does. The overrunning clutch 82 is provided to allow the flywheel 46 to coast when the rotor slows down toward or to idle condition, since otherwise the flywheel would resist deceleration of the rotor and would give up its stored energy to the rotor as the rotor is decelerated.

A flywheel of this sort will coast for a relatively long time, so that the system of FIGURE 3 will make energy available for acceleration after a pause of reasonable length such as a stop in traffic, even though no constant driving power is provided for the flywheel. The system of FIGURE 3 has the disadvantage that flywheel 46 will not be accelerated to its top speed unless the rotor reaches its rated speed. However, it is simpler in some respects than the other systems described. In the system of FIGURE 3, the clutch 79 might preferably be a fluid coupling type clutch which is responsive to electrical control, such as a fill and empty type coupling, the filling and emptying of which are under control of the coil 86. The capacity of clutch 79 should be much lower than that of clutch 43, since it is not desirable to accelerate the flywheel 46 very rapidly in view of the excessive power drain from the gas generator rotor. A very small torque will be sufficient to provide a power output from clutch 79 of 2 to 5 horsepower and ample acceleration of the flywheel.

Figure 4:
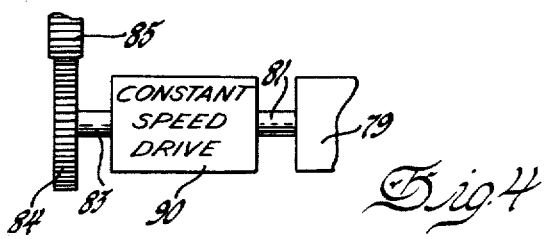
FIGURE 4 is a fragmentary view of a modification of the system of FIGURE 3.

The disadvantages, referred to above, of the system of FIGURE 3 may be overcome by substituting a constant speed drive for the overrunning clutch 82. As illustrated by FIGURE 4, a constant speed drive 90 is substituted for the overrunning clutch 82, the system being otherwise the same as previously described with respect to FIGURE 3. The constant speed drive is a known type of variable ratio power transmission in which the ratio is controlled by the speed of the output shaft and the drive tends to maintain the output shaft speed constant. Various devices of this sort are known, embodying variable hydraulic and mechanical transmissions. Considering this installation in terms of the speed example previously used, it will be apparent that if the constant speed drive taken in connection with the gears 76, 77 and 84, 85 can provide a 4 to 1 step-up ratio from shaft 26 to shaft 44, the flywheel may be maintained at full speed with the engine idling at 14,000 r.p.m. This makes it possible to bring the flywheel to full speed, or hold it there, even though the rotor is below rated speed. It also permits elimination of the overrunning clutch. If the rotor is running at a speed above idle and is slowed down, the constant speed drive will increase its ratio, allowing the flywheel to continue to run at constant speed and the rotor to decelerate. The system of FIGURE 4 is capable of superior performance, but suffers from the disadvantage that commercially available constant speed drives tend to be expensive and heavy.

The invention has been described herein in connection with a free turbine type of engine. It will be apparent, of course, that this invention may be employed with other engines such as those wherein a turbine such as 13 drives not only the compressor but also the power output shaft. Such an engine with a two-stage turbine might be illustrated in the same manner as the engine E of FIGURE 1, except that shafts 14 and 18 would be joined between the two turbine wheels. The free turbine can utilize the accelerator of the invention more readily than the single rotor type of engine, since the flywheel needs to accelerate only the minimum amount of inertia due to the gas generator rotor. If additional turbine stages to provide external power output must be accelerated, a greater amount of energy is required. Also, in most cases the power output shaft would have to be declutched from the external load. It would not be practicable to attempt to accelerate the entire engine and the vehicle which it powers by accelerating means such as that described. Something like ten times the amount of energy would be required. By accelerating only the gas generator, a relatively small amount of energy needs to be taken from the flywheel; and once this energy has been supplied, the gas turbine provides ample power to accelerate the vehicle.

The figures have illustrated the flywheel as being coupled through a 1 to 1 ratio transmission to the rotor. This is not essential. The essential matter is the kinetic energy storage capacity or effective moment of inertia of the flywheel with respect to the rotor. A smaller flywheel geared down to the rotor, or a larger flywheel geared up to the rotor, could be used instead of the specific example analyzed.

The time taken to accelerate the rotor may vary. A preferred interval of 1/10 second has been referred to in the numerical examples. This is a very short time, particularly with relation to the rather slow acceleration of the unassisted gas generator. The overall operation of the gas turbine can be greatly improved even with a substantially longer clutching period for acceleration of the rotor by the flywheel. Increasing this time interval does not change the energy storage requirement. However, the accelerating torque is inversely proportional to the time through which it acts. With the values of inertia referred to above, the average torque would be about 250 pounds feet for 1/10 second acceleration time. For 1/2 second, the torque would be about 50 pounds feet. Even a 1/2 second acceleration time is only about 1/12 the present time required for the gas generator to accelerate.

It will be apparent from the foregoing description and analysis that this invention presents a practicable way of overcoming the acceleration lag drawback to use of gas turbine engines in fields such as automobile propulsion.

The detailed description of preferred embodiments of the invention, to explain the principles thereof, is not to be considered as limiting the invention. Many modifications within the scope of the invention may be devised by the exercise of skill in the art.

I claim:

1. A power plant comprising, in combination, a gas turbine engine including a rotor, and means for rapidly accelerating the said rotor from idling speed to a substantially higher normal operating speed comprising a flywheel having a kinetic energy storage capacity of the same order of magnitude as that of the said rotor, power supply means coupled to the flywheel adapted to accelerate the flywheel to an effective speed higher than the normal operating speed of the said rotor and maintain it at such speed, power transmission means between the flywheel and the said rotor including a normally disengaged clutch, manually operable means controlling the power level of the engine operable to vary power over a range from idling to full power, and means operated by the manually operable controlling means for engaging the clutch temporarily when the manually operable controlling means is moved to a position calling for acceleration of the said rotor.

2. A combination as recited in claim 1 in which the power supply means is an electric motor having an inherently limited maximum speed.

3. A combination as recited in claim 1 in which the power supply means is a radial-inward-flow turbine.

4. A combination as recited in claim 1 in which the power supply means comprises a normally engaged clutch and an overrunning clutch coupling the flywheel to the rotor, and means operated by the controlling means for disengaging the normally engaged clutch when the normally disengaged clutch is engaged.

5. A combination as recited in claim 1 in which the power supply means comprises a normally engaged clutch and a constant speed type variable ratio transmission coupling the flywheel to the rotor, and means operated by the controlling means for disengaging the normally engaged clutch when the normally disengaged clutch is engaged.

6. A power plant comprising, in combination, a gas turbine engine including a rotor, and means for rapidly accelerating the said rotor from idling speed to a substantially higher normal operating speed comprising a flywheel having a kinetic energy storage capacity of the same order of magnitude as that of the said rotor, power supply means coupled to the flywheel adapted to accelerate the flywheel to an effective speed higher than the normal operating speed of the said rotor and maintain it at such speed, power transmission means between the flywheel and the said rotor including a normally disengaged clutch, manually operable means controlling the power level of the engine operable to vary power over a range from idling to full power, means operated by the manually operable controlling means for engaging the clutch when the manually operable controllings means is moved to a position calling for acceleration of the said rotor, and means responsive to the rotor speed operative to disengage the clutch when the rotor is at normal operating speed.

7. A combination as recited in claim 6 in which the power supply means is an electric motor having an inherently limited maximum speed.

8. A combination as recited in claim 6 in which the power supply means is a radical-inward-flow turbine energized from the gas turbine engine.

9. A combination as recited in claim 6 in which the power supply means comprises a normally engaged clutch and an overrunning clutch coupling the flywheel to the rotor, and means operated by the controlling means for disengaging the normally engaged clutch when the normally disengaged clutch is engaged.

10. A combination as recited in claim 6 in which the power supply means comprises a normally engaged clutch and a constant speed type variable ratio transmission coupling the flywheel to the rotor, and means operated by the controlling means for disengaging the normally engaged clutch when the normally disengaged clutch is engaged.

References Cited in the file of this patent

UNITED STATES PATENTS

| | | |
|---|---|---|
| 2,402,547 | Gilfillan | June 25, 1946 |
| 2,547,660 | Prince | Apr. 3, 1951 |
| 2,851,113 | Irwin et al. | Sept. 9, 1958 |
| 2,914,962 | Schmidt | Dec. 1, 1959 |
| 2,924,935 | Moore | Feb. 16, 1960 |

FOREIGN PATENTS

| | | |
|---|---|---|
| 159,371 | Australia | Oct. 18, 1954 |
| 202,568 | Australia | June 27, 1956 |
| 545,048 | Great Britain | May 8, 1942 |
| 578,770 | Great Britain | July 11, 1946 |

UNITED STATES PATENT OFFICE
CERTIFICATE OF CORRECTION

Patent No. 3,097,485 July 16, 1963

Joseph B. Bidwell

It is hereby certified that error appears in the above numbered patent requiring correction and that the said Letters Patent should read as corrected below.

Column 8, line 29, for "radical-inward-flow" read -- radial-inward-flow --.

Signed and sealed this 14th day of January 1964.

(SEAL)
Attest:
ERNEST W. SWIDER

Attesting Officer

EDWIN L. REYNOLDS

Acting Commissioner of Patents